US012304273B2

(12) United States Patent
Lin

(10) Patent No.: US 12,304,273 B2
(45) Date of Patent: May 20, 2025

(54) EXPANSION TANK, VEHICLE COOLING SYSTEM AND VEHICLE

(71) Applicants: ZHEJIANG LIANKONG TECHNOLOGIES CO., LTD, Zhejiang (CN); ZHEJIANG GEELY HOLDING GROUP CO., LTD, Zhejiang (CN)

(72) Inventor: Bingrong Lin, Ningbo (CN)

(73) Assignees: ZHIEJIANG LIANKONG TECHNOLOGIES CO., LTD, Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 332 days.

(21) Appl. No.: 18/000,708

(22) PCT Filed: Jun. 5, 2020

(86) PCT No.: PCT/CN2020/094773
§ 371 (c)(1),
(2) Date: Dec. 5, 2022

(87) PCT Pub. No.: WO2021/243720
PCT Pub. Date: Dec. 9, 2021

(65) Prior Publication Data
US 2023/0211644 A1    Jul. 6, 2023

(51) Int. Cl.
*B60H 1/00*    (2006.01)
*B60K 11/02*    (2006.01)

(52) U.S. Cl.
CPC ..... *B60H 1/00392* (2013.01); *B60H 1/00278* (2013.01); *B60K 11/02* (2013.01)

(58) Field of Classification Search
CPC ............ B60H 1/00392; B60H 1/00278; B60H 1/00571; B60H 1/00557; B60H 1/00899;
(Continued)

(56) References Cited

U.S. PATENT DOCUMENTS

| 5,510,208 A | 4/1996 | Hall et al. |
| 12,246,579 B2 * | 3/2025 | Kim ................... B60H 1/00899 |
| 2012/0090348 A1 | 4/2012 | O'Rourke et al. |

FOREIGN PATENT DOCUMENTS

| CN | 202405391 U | 8/2012 |
| CN | 103178310 A | 6/2013 |

(Continued)

OTHER PUBLICATIONS

English translation of Tong (CN 204783236 U). (Year: 2015).*
(Continued)

*Primary Examiner* — Miguel A Diaz
(74) *Attorney, Agent, or Firm* — Westbridge IP LLC

(57) ABSTRACT

Disclosed is an expansion tank, including a cavity structure and a degassing flow channel, where the degassing flow channel is arranged on the expansion tank, a flow guide hole is provided on the degassing flow channel, and the degassing flow channel is in communication with the cavity structure by means of the flow guide hole; and a liquid inlet and a liquid outlet are provided at two ends of the degassing flow channel respectively and are used for being in communication with a vehicle cooling system. The expansion tank of the present application satisfies a degassing requirement, reduces usage amount of pipelines and pipe clamps, and reduces weight of a vehicle body.

11 Claims, 1 Drawing Sheet

(58) Field of Classification Search
CPC .............. B60H 1/3211; B60H 1/3228; B60H 2001/3285; B60H 2001/3297; B60K 11/02
See application file for complete search history.

(56) References Cited

FOREIGN PATENT DOCUMENTS

| CN | 202986803 U | 6/2013 |
| CN | 203978593 U | 12/2014 |
| CN | 204783236 U | 11/2015 |
| CN | 104018928 B | 5/2016 |
| DE | 10 2017 010286 A1 | 5/2018 |
| EP | 2852267 A1 | 3/2015 |
| EP | 3012429 A1 | 4/2016 |
| JP | 2008103297 A | 5/2008 |
| JP | 2010281245 A | 12/2010 |
| JP | 2016100193 A | 5/2016 |
| JP | 2017101573 A | 6/2017 |

OTHER PUBLICATIONS

International Search Report and Written Opinion for PCT/CN2020/094773 (ISA/CN) mailed Feb. 9, 2021 (9 pages).
1st Office Action for European Patent Application No. 2098903.0 dated May 9, 2023 (6 pages).
2nd Office Action for European Patent Application No. 20938903.0 dated Aug. 1, 2023 (5 pages).
Annex to the communication about intention to grant a European patent issued in counterpart European Patent Application No. EP 20938903.0, dated Apr. 2, 2024.
Notice of Reasons for Refusal issued in counterpart Japanese Patent Application No. JP 2022-574234, dated Mar. 26, 2024.

* cited by examiner

EXPANSION TANK, VEHICLE COOLING SYSTEM AND VEHICLE

CROSS-REFERENCE TO RELATED APPLICATIONS

The present application is a national phase entry of International Application No. PCT/CN2020/094773, filed Jun. 5, 2020, which is incorporated herein by reference in its entirety.

FIELD OF THE INVENTION

The present disclosure relates to the technical field of vehicles, and in particular to an expansion tank, a vehicle cooling system and a vehicle.

BACKGROUND OF THE INVENTION

An automobile cooling system mainly plays a role in dissipating heat generated by a power system during working into air, so as to prevent the power system from overheating. For an automobile equipped with a liquid cooling system, a coolant is in a liquid circulation in the cooling system, and will absorb heat when flowing through the high-temperature power system, thereby reducing the temperature of the power system. The coolant flows to a heat exchanger (or a radiator) after flowing through the power system, and heat in the coolant is dissipated to air by means of the heat exchanger. Since the coolant contains evaporable components in most cases, when the power system works, steam will be generated in the cooling system, and the pressure of the cooling system will also constantly change along with the change of the temperature of the coolant. If the steam cannot be discharged and circulates in a cooling pipeline all the time, air resistance will be caused in a radiator pipeline, resulting in poor heat dissipation.

In the prior art, for vehicles equipped with an engine as the power system, the cooling system usually utilizes the radiator for liquid-gas separation, and a gas outlet is provided at the highest portion of a water chamber of the radiator, such that steam in the coolant is discharged from the gas outlet.

However, for most new energy battery electric vehicles, a battery cooling system thereof is not equipped with the radiator, the pipeline thereof is routed in a complex way, and air is more likely to be accumulated. Thus, it is more important to rapidly separate liquid and gas in a battery cooling loop. Presently, a special liquid-gas separator is connected in series with the main loop of the cooling system on some vehicles, but the addition of the liquid-gas separator causes sharp rise in the cost and weight of the entire cooling system.

BRIEF DESCRIPTION OF THE INVENTION

The technical problem to be solved by the present disclosure is that it is necessary for an existing cooling system for a new energy vehicle to additionally arrange a liquid-gas separation device, resulting in high weight and cost.

In order to solve the above technical problem, in a first aspect, an embodiment of the present application discloses an expansion tank. The expansion tank includes a cavity structure and a degassing flow channel, where the degassing flow channel is arranged on the expansion tank, a flow guide hole is provided on the degassing flow channel, and the degassing flow channel is in communication with the cavity structure by means of the flow guide hole; and a liquid inlet and a liquid outlet are provided at two ends of the degassing flow channel respectively, and the liquid inlet and the liquid outlet are used for being in communication with a vehicle cooling system.

Further, the degassing flow channel is arranged in the cavity structure.

Further, the degassing flow channel is detachably connected to the cavity structure.

Further, the degassing flow channel and the cavity structure are integrally formed.

Further, the degassing flow channel has a sectional area not less than that of the liquid inlet.

Further, a plurality of flow guide holes are provided on the degassing flow channel, and the plurality of flow guide holes are uniformly provided on the degassing flow channel at intervals.

Further, the degassing flow channel includes a side wall and a cover plate, the cover plate being detachably connected to the side wall.

Further, the flow guide holes are provided on the side wall and/or the cover plate of the degassing flow channel.

Further, the expansion tank is formed in an injection molding manner.

Further, a filling port is provided on the expansion tank, the filling port is provided at a top of the cavity structure, and the filling port is used for filling a coolant.

Further, a liquid level gauge is further arranged on the expansion tank, is arranged on a side wall of the cavity structure, and is used for indicating a liquid level of the coolant in the cavity structure.

Further, the expansion tank further includes a pressure regulating device, where the pressure regulating device is used for regulating internal pressure of the expansion tank.

Further, the pressure regulating device includes a pressure relief valve, the pressure relief valve being arranged on an upper portion of the expansion tank.

In a second aspect, an embodiment of the present application discloses a vehicle cooling system. The cooling system includes the expansion tank described above.

In a third aspect, an embodiment of the present application discloses a vehicle. The vehicle includes the vehicle cooling system described above.

With use of the above technical solution, the expansion tank, the vehicle cooling system and the vehicle of the embodiments of the present application have the following beneficial effects:

1) according to the expansion tank of the embodiments of the present application, a bottom of the expansion tank is provided with the degassing flow channel for degassing, the flow guide holes are provided on the degassing flow channel, the coolant in the cooling system enters the degassing flow channel via the liquid inlet, bubbles in the coolant are discharged via the flow guide holes, and the coolant with gas discharged enters a circulation loop via the liquid outlet; and a degassing requirement may be satisfied without additionally arranging a liquid-gas separation device, usage amount of pipelines and pipe clamps is reduced, weight of a vehicle body is reduced, lightweight design is satisfied, and the purpose of reducing cost is achieved;

2) according to the expansion tank of the embodiments of the present application, the degassing flow channel and the expansion tank are integrally injection-molded, later assembly operation is not needed, an assembly procedure is reduced, and cost is saved; and the cover plate is detachably connected to the flow channel, such that on one hand, process difficulty during injection molding is reduced, and on the other hand, the degassing flow channel is conveniently inspected and overhauled;

(3) according to the expansion tank of the embodiments of the present application, the pressure regulating device in communication with an interior of the expansion tank is arranged to maintain pressure in the cavity structure stable, such that a pressure difference between an inner side and an outer side of the expansion tank is in a balanced state, and a degassing effect is ensured; and 4) according to the vehicle cooling system of the embodiments of the present application, the expansion tank in a battery box cooling loop is connected to a main cooling system, and the degassing flow channel is arranged at the bottom of the expansion tank, such that the coolant with bubbles enters a tank body of the expansion tank for liquid-gas separation without additionally arranging a liquid-gas separation device, usage amount of pipelines and pipe clamps is reduced, and cost investment is reduced; and moreover, space occupied by the pipelines, the pipe clamps and the liquid-gas separation device is saved, and an arrangement space is provided for optimization of the interior of the vehicle.

BRIEF DESCRIPTION OF THE DRAWINGS

In order to more clearly illustrate technical solutions in embodiments of the present application, a brief introduction to the accompanying drawings required for the description of the embodiments will be provided below. Obviously, the accompanying drawings in the following description are only some of the embodiments of the present application, and those of ordinary skill in the art would also be able to derive other accompanying drawings from these accompanying drawings without making creative efforts.

The figures are supplementarily described below.

Figure 1:
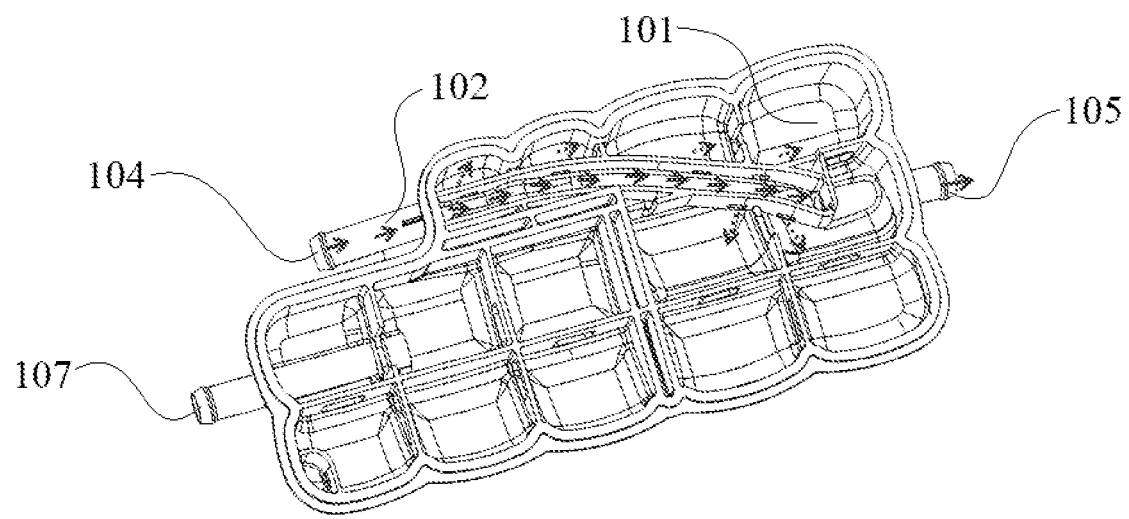
FIG. 1 is a structural perspective view of an expansion tank of an embodiment of the present application.

101—cavity structure; 102—degassing flow channel; 103—flow guide hole; 104—liquid inlet; 105—liquid outlet; 106—cover plate; and 107—filling port.

DETAILED DESCRIPTION

The technical solutions in embodiments of the present application will be clearly and completely described below in combination with the accompanying drawings in the embodiments of the present application. Apparently, the embodiments described are merely some rather than all of the embodiments of the present application. Based on the embodiments of the present application, all other embodiments obtained by those of ordinary skill in the art without making creative efforts fall within the scope of protection of the present application.

"An embodiment" or "embodiments" herein refer to specific features, structures or characteristics that may be included in at least one implementation of the present application. In the description of the present application, it is to be understood that the orientation or positional relations indicated by the terms "up", "down", "top", "bottom", etc. are based on the orientation or positional relations shown in the accompanying drawings, are merely for facilitating the description of the present application and simplifying the description, rather than indicating or implying that a device or element referred to must have a particular orientation or be constructed and operated in a particular orientation, and therefore will not be interpreted as limiting the present application. In addition, the terms "first", "second", etc. are for descriptive purposes only and are not to be construed as indicating or implying their relative importance or implicitly specifying the number of indicated technical features. Thus, a feature defined with "first" and "second" may explicitly or implicitly include one or more of the features. Moreover, the terms "first", "second", etc. are used to distinguish similar objects, but are not necessarily used to describe a specific sequence or a precedence order. It should be understood that data used in this way may be interchanged where appropriate, such that the embodiments of the present application described herein may be implemented in other sequences than those illustrated or described herein.

The flow of a coolant mainly depends on pressure of a water pump, steam bubbles are generated on one side of a water pump having low water suction pressure, and the steam bubbles are also generated when a temperature of the coolant rises, and in this case, the condition that the amount of the coolant is reduced occurs. If steam can not be discharged and circulates in a cooling pipeline all the time, air resistance is generated in a radiator pipeline, resulting in poor heat dissipation, thereby affecting service life of a power system. For fuel vehicles, the steam bubbles flow in a radiator by means of a guide pipe, such that the radiator is utilized for liquid-gas separation. However, for a new energy battery electric vehicle, a battery cooling system does not have a radiator, and in this case, the radiator may not be utilized for liquid-gas separation.

In order to automatically remove the steam bubbles in a cooling system, as shown in FIG. 1, an embodiment of the present application discloses an expansion tank. The expansion tank includes a cavity structure 101 and a degassing flow channel 102, where the degassing flow channel 102 is arranged on the expansion tank, a flow guide hole 103 is provided on the degassing flow channel 102, and the degassing flow channel 102 is in communication with the cavity structure 101 by means of the flow guide hole 103; and a liquid inlet 104 and a liquid outlet 105 are provided at two ends of the degassing flow channel 102 respectively, and the liquid inlet 104 and the liquid outlet 105 are used for being in communication with a vehicle cooling system.

According to the expansion tank of the embodiment of the present application, a bottom of the expansion tank is provided with the degassing flow channel 102 for degassing, the flow guide hole 103 is provided on the degassing flow channel 102, the coolant in the cooling system enters the degassing flow channel 102 via the liquid inlet 104, bubbles in the coolant are discharged via the flow guide hole 103, and the coolant with gas discharged enters a circulation loop via the liquid outlet 105; and a degassing requirement may be satisfied without additionally arranging a liquid-gas separation device, usage amount of pipelines and pipe clamps is reduced, weight of a vehicle body is reduced, lightweight design is satisfied, and the purpose of reducing cost is achieved.

In the embodiment of the present application, an interior of the expansion tank is of the hollow cavity structure 101, and the expansion tank may be in a regular shape such as a cylinder shape, a frustum shape and a cube shape, or may alternatively be in an irregular shape. The expansion tank is made of plastic or metal, such as stainless steel, aluminum or aluminum alloy. The degassing flow channel 102 is of a tubular structure. Optionally, the degassing flow channel 102 is a circular pipe, a square pipe, or another polygonal pipe. One or more flow guide holes 103 are provided on the degassing flow channel 102. Optionally, each flow guide hole 103 is a circular hole, a triangular hole, a square hole or another polygonal hole, and may alternatively be an irregular hole. The flow guide holes 103 have a hole diameter ranging from 2 mm to 20 mm, and the hole diameter, shape and position thereof may be determined according to specific conditions. For example, an exhaust effect of the degassing flow channel 102 may be related to the shape, size, placement angle, etc. of the expansion tank. Specifically, the hole diameter and position at which the exhaust effect is optimal may be determined as the final hole diameter and position of the flow guide holes 103 by using a three dimensional (3D) printing technology, an analog simulation technology, etc. for verification. The flow guide holes 103 are provided on a surface in contact with the expansion tank, and the expansion tank is in communication with the degassing flow channel 102 by means of the flow guide holes 103. The degassing flow channel 102 and the expansion tank are detachably connected to each other or integrally formed. The degassing flow channel 102 is arranged on an outer side of the expansion tank, or may alternatively be arranged in the cavity structure 101. Optionally, the degassing flow channel 102 is provided at the bottom of the expansion tank; optionally, the degassing flow channel 102 is arranged on a sidewall close to the bottom. Optionally, one end of the degassing flow channel 102 is arranged at the bottom of the expansion tank, and the other end of the degassing flow channel is arranged on a side wall of the expansion tank. Optionally, two ends of the degassing flow channel 102 are each arranged on the side wall of the expansion tank, and a middle of the degassing flow channel 102 is arranged in the cavity structure 101 in a suspended manner. After the coolant is injected into the expansion tank, the flow guide holes 103 on the degassing flow channel 102 should be partially or completely immersed into the coolant. In some embodiments, the degassing flow channel 102 is arranged on the outer side of the expansion tank, the degassing flow channel 102 and the expansion tank are integrally formed, the flow guide holes 103 are provided on a surface of the degassing flow channel 102 joined with the expansion tank, and the degassing flow channel 102 is in communication with the cavity structure 101 by means of the flow guide holes 103. In other embodiments, the degassing flow channel 102 is arranged on the outer side of the expansion tank, a clamping groove is provided on the outer side of the expansion tank, the flow guide holes 103 are provided in the clamping groove, the degassing flow channel 102 is in a trough shape having one open side, and the degassing flow channel 102 may be connected to the clamping groove in a clamped manner. Connecting ports are provided at two ends of the degassing flow channel 102, and when the expansion tank is connected to a cooling system, the two connecting ports of the degassing flow channel 102 are connected to a coolant circulation pipeline. The coolant circulates in the circulation pipeline of the cooling system, and when the coolant enters the degassing flow channel 102 from the liquid inlet 104, the steam bubbles in the coolant are discharged out of the coolant through the flow guide holes, and gas in the steam bubbles enters an upper space of the expansion tank. After the steam bubbles are discharged, the coolant enters the circulation pipeline again through the liquid outlet 105 for circulation.

As shown in FIG. 1, the degassing flow channel 102 is arranged in the cavity structure 101.

In the embodiment of the present application, in order to make the degassing flow channel 102 be not liable to being damaged by collision and friction, and ensure reliability of connection between the degassing flow channel 102 and the expansion tank, preferably, the degassing flow channel 102 is arranged in the cavity structure 101, and the liquid inlet 104 and the liquid outlet 105 of the degassing flow channel 102 may be integrated on the side wall of the expansion tank.

The degassing flow channel 102 is detachably connected to the cavity structure 101.

In the embodiment of the present application, the degassing flow channel 102 may be an independent pipe, a through hole for mounting the degassing flow channel 102 is provided on the expansion tank, the degassing flow channel 102 penetrates the through hole to be arranged at the bottom of the expansion tank, and two ends of the degassing flow channel 102 are reserved on the outer side of the expansion tank. In some embodiments, the liquid inlet 104 and the liquid outlet 105 which are in communication with the internal cavity structure 101 are provided on the expansion tank, and two ends of the degassing flow channel 102 are connected to the liquid inlet 104 and the liquid outlet 105 inside the cavity structure 101.

The degassing flow channel 102 and the cavity structure 101 are integrally formed.

In the embodiment of the present application, in order to reduce an assembly procedure, save cost and further reduce weight at the same time, the degassing flow channel 102 may be connected to the cavity structure 101 together in an integral forming manner. Optionally, the integral forming manner includes: casting molding, injection molding, 3D printing, etc.

The degassing flow channel 102 has a sectional area not less than that of the liquid inlet 104.

In the embodiment of the present application, the degassing flow channel 102 has the sectional area greater than or equal to that of the liquid inlet 104, such that when the coolant enters the degassing flow channel 102 from the liquid inlet 104, a flow speed of the coolant is slowed down due to a change of a caliber of a pipeline, thereby being more conducive to discharge of steam bubbles.

Figure 2:
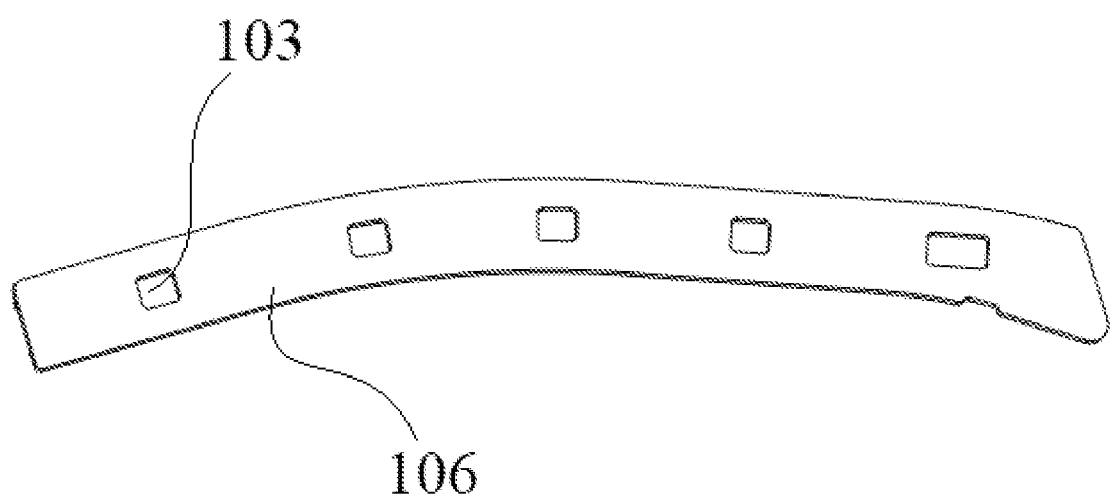
FIG. 2 is a structural schematic diagram of a cover plate of an embodiment of the present application.

As shown in FIG. 2, a plurality of flow guide holes 103 are provided on the degassing flow channel 102, and the plurality of flow guide holes 103 are uniformly provided on the degassing flow channel 102 at intervals.

In the embodiment of the present application, in order to ensure a degassing effect, the plurality of flow guide holes 103 may be provided on the degassing flow channel 102. Optionally, hole shapes of the plurality of flow guide holes 103 may be the same, and for example, all the flow guide holes 103 are square holes. Optionally, the hole shapes of the plurality of flow guide holes 103 may not be all the same, and for example, square holes, circular holes, triangular holes, etc. may be present in the flow guide holes 103 at the same time. In addition, hole diameters of the flow guide holes 103 may not be completely equal. Preferably, the plurality of flow guide holes 103 are uniformly distributed on the degassing flow channel 102 at equal intervals. In some embodiments, the plurality of flow guide holes 103 may alternatively be randomly distributed on the degassing flow channel 102, and intervals between the plurality of flow guide holes 103 are not completely equal.

As shown in FIGS. 1 and 2, the degassing flow channel 102 includes a side wall and a cover plate 106, the cover plate 106 being detachably connected to the side wall.

In the embodiment of the present application, when the degassing flow channel 102 is arranged inside the cavity structure 101, the degassing flow channel 102 may be configured into two portions, i.e., the detachable cover plate 106 and a flow channel body, in order to facilitate assembly. Optionally, a top end of the side wall is provided with a clamping groove, and two side edges of the cover plate 106 may be clamped into the clamping groove.

As shown in FIG. 2, the flow guide holes 103 are provided on the side wall and/or the cover plate 106 of the degassing flow channel 102.

In the embodiment of the present application, the flow guide holes 103 may be provided only on the side wall or on the cover plate 106 at a top of the degassing flow channel 102. Since a flow speed of the coolant is not fixed in the circulation pipeline of the cooling system, preferably, the plurality of flow guide holes 103 are provided on the side wall or the cover plate 106 at the top of the degassing flow channel 102, thereby being more conducive to discharge of steam bubbles.

The expansion tank is formed in an injection molding manner.

In the embodiment of the present application, the expansion tank is formed in an injection molding manner, such that weight may further be reduced, and meanwhile, a production process and an assembly process may be simplified, and cost may be reduced.

As shown in FIG. 1, a filling port 107 is provided on the expansion tank, the filling port 107 is provided at a top of the cavity structure 101, and the filling port 107 is used for filling the coolant.

In the embodiment of the present application, after being added into the expansion tank from the filling port 107, the coolant enters the degassing flow channel 102 via the flow guide holes 103 and thus enters a circulation system for circulation. In some embodiments, a liquid drain port in communication with the circulation pipeline of the cooling system is further provided on the expansion tank, and the coolant enters the circulation pipeline from the liquid drain port for circulation.

A liquid level gauge is further arranged on the expansion tank, is arranged on a side wall of the cavity structure 101, and is used for indicating a liquid level of the coolant in the cavity structure 101.

In the embodiment of the present application, a liquid level observation window is arranged on the side wall of the expansion tank, a lowest liquid level line and a highest liquid level line are marked on the observation window, and a liquid level depth of the coolant should be between the lowest liquid level line and the highest liquid level line. In some embodiments, a liquid level gauge may further be a liquid level sensor, and may directly measure a liquid level depth and indicate the liquid level depth on a vehicle console.

The expansion tank further includes a pressure regulating device, where the pressure regulating device is used for regulating internal pressure of the expansion tank.

In the embodiment of the present application, gas discharged from the steam bubbles is continuously accumulated in an upper space of the expansion tank, such that air pressure in the expansion tank is increased, and discharge of the steam bubbles in the coolant is affected. Therefore, it is necessary to arrange the pressure regulating device on the expansion tank to discharge gas in the cavity structure 101 out of the expansion tank when pressure in the expansion tank rises, thereby maintaining air pressure in the cavity structure 101 stable.

The pressure regulating device includes a pressure relief valve, the pressure relief valve being arranged on an upper portion of the expansion tank.

In the embodiment of the present application, the pressure relief valve is arranged on the upper portion or a top of the expansion tank, an internal space of the expansion tank is in communication with the outside by means of the pressure relief valve, and when air pressure in the expansion tank rises, gas is discharged by means of the pressure relief valve. Optionally, a pressure sensor is arranged in the expansion tank, when the pressure sensor detects that air pressure in the cavity structure 101 rises and exceeds a threshold, it is fed back to a whole vehicle controller, and the whole vehicle controller controls the pressure relief valve to be opened to discharge gas. In some embodiments, the pressure regulating device may alternatively be an air pump arranged outside the expansion tank and in communication with the cavity structure 101. When air pressure in the expansion tank rises, the air pump pumps out gas from the cavity structure 101. Specifically, when the pressure sensor detects that the air pressure in the cavity structure 101 rises and exceeds the threshold, it is fed back to the whole vehicle controller, and the whole vehicle controller controls the air pump to start to pump gas out of the cavity structure 101. Preferably, starting and stopping of the air pump are controlled by setting proper threshold parameters, such that a stable micro-negative pressure environment is maintained in the expansion tank, which is more conducive to discharge of steam bubbles in the coolant.

An embodiment of the present application further discloses a vehicle cooling system. The cooling system includes the expansion tank described above.

According to the vehicle cooling system of the embodiment of the present application, the expansion tank in a battery box cooling loop is connected to a main cooling system, and the degassing flow channel 102 is arranged at the bottom of the expansion tank, such that the coolant with bubbles enters a tank body of the expansion tank for liquid-gas separation without additionally arranging a liquid-gas separation device, usage amount of pipelines and pipe clamps is reduced, and cost investment is reduced; and moreover, space occupied by the pipelines, the pipe clamps and the liquid-gas separation device is saved, and an arrangement space is provided for optimization of the interior of the vehicle.

An embodiment of the present application discloses a vehicle. The vehicle includes the vehicle cooling system described above.

What are described above are merely preferred embodiments of the present application but not intended to limit the present application, and any modifications, equivalent replacements, improvements, etc. made within the spirit and principles of the present application should fall within the scope of protection of the present application.

What is claimed is:

1. An expansion tank, comprising a cavity structure and a degassing flow channel, wherein
the degassing flow channel is arranged on the expansion tank, a flow guide hole is provided on the degassing flow channel, and the degassing flow channel is in communication with the cavity structure by means of the flow guide hole;
a liquid inlet and a liquid outlet are provided at two ends of the degassing flow channel respectively, and the liquid inlet and the liquid outlet are used for being in communication with a vehicle cooling system; and the degassing flow channel is arranged in the cavity structure, the degassing flow channel is detachably connected to the cavity structure, the degassing flow channel has a sectional area not less than that of the liquid inlet and a plurality of flow guide holes are provided on the degassing flow channel, and the plurality of flow guide holes are uniformly provided on the degassing flow channel at intervals.

2. The expansion tank according to claim 1, wherein the degassing flow channel and the cavity structure are integrally formed.

3. The expansion tank according to claim 1, wherein the degassing flow channel comprises a side wall and a cover plate, the cover plate being detachably connected to the side wall.

4. The expansion tank according to claim 3, wherein the flow guide holes are provided on the side wall and/or the cover plate of the degassing flow channel.

5. The expansion tank according to claim 2, wherein the expansion tank is formed in an injection molding manner.

6. The expansion tank according to claim 1, wherein a filling port is provided on the expansion tank, the filling port is provided at a top of the cavity structure, and the filling port is used for filling a coolant.

7. The expansion tank according to claim 6, wherein a liquid level gauge is further arranged on the expansion tank, is arranged on a side wall of the cavity structure, and is used for indicating a liquid level of the coolant in the cavity structure.

8. A vehicle cooling system, comprising the expansion tank of claim 1.

9. A vehicle, comprising the vehicle cooling system of claim 8.

10. The expansion tank according to claim 2, wherein the degassing flow channel comprises a side wall and a cover plate, the cover plate being detachably connected to the side wall.

11. The expansion tank according to claim 10, wherein the flow guide holes are provided on the side wall and/or the cover plate of the degassing flow channel.

* * * * *